Feb. 2, 1954   R. E. KORTEPETER ET AL   2,667,776
UNDER LIQUID SEAL FOR ROTATABLE SHAFTS
Filed Oct. 31, 1950

INVENTORS
RALPH E. KORTEPETER
BY RALPH L. ARCHBOLD
W. G. Sullivan
ATTORNEY

Patented Feb. 2, 1954

2,667,776

UNITED STATES PATENT OFFICE 2,667,776

UNDER LIQUID SEAL FOR ROTATABLE SHAFTS

Ralph E. Kortepeter, Cleveland Heights, and Ralph L. Archbold, Euclid, Ohio, assignors to The Apex Electrical Manufacturing Company, Cleveland, Ohio, a corporation of Ohio Application October 31, 1950, Serial No. 193,162

1 Claim. (Cl. 68—133)

This invention relates to seals adapted to function beneath a liquid level to prevent the escape of liquid around a rotatable shaft, and more particularly to means associated with the seal for preventing direct contact of liquid with the seal.

Under-liquid or under-water seals are frequently used on washing machines and the like, wherein a rotatable or oscillatable shaft projects upwardly through the base of the machine tub to actuate an agitator or washing element. It is necessary to provide an effective seal between the shaft and tub base to prevent liquid from contacting and damaging the gear case and other working parts disposed beneath the tub. It is desirable to use a relatively inexpensive seal and if liquid, particularly liquids containing detergents or soap, penetrates the seal, it is rendered ineffective in a short period requiring a relatively expensive service replacement.

In the case of a packing gland type seal, wherein a hemp or the like cord impregnated with a lubricant, such as tallow, directly contacts the shaft surface, liquid penetrating the seal tends to wash away the lubricant and create rust particles so that the sealing contact is quickly destroyed. In the case of a rotary type seal, wherein the sealing contact is made by a self-lubricating ring formed of carbon or the like and having sliding contact with a brass or the like ring, the action of the liquid and detergent or soap tends to pit the sealing surface thereby destroying its effectiveness.

According to the invention, we provide a diving bell arrangement for seals of the above general type comprising an element of inverted cup form fixed to the shaft or agitator whereby as the tub fills with liquid an air pocket is formed within the bell and around the seal, preventing liquid from directly contacting the seal. It is necessary to prevent the escape of air above the bell and through the seal and to this extent the seal functions as an air seal.

It is a primary object of the invention to provide means in association with a seal for a rotary or oscillatable shaft and adapted to function beneath the liquid level for substantially extending the useful life of the seal.

Another object of the invention is to provide means for preventing liquid from directly contacting a seal of the above type.

Another object of the invention is to provide means of the above type which can be adapted to a conventional seal and which is relatively inexpensive to manufacture and assemble.

Other objects of the invention and the invention itself will become increasingly apparent from a consideration of the following description and drawings, wherein.

Figure 1:
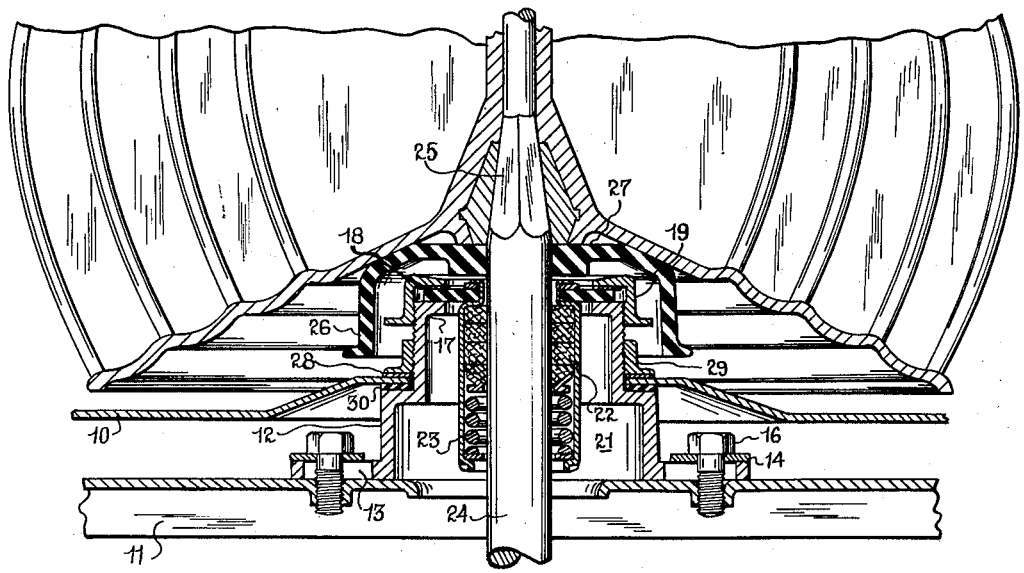
Figure 1 is a fragmentary vertical sectional view of a washing machine embodying the invention.

Referring now to the drawings, we have indicated at 10 the bottom of a conventional washing machine tub, which is provided with a central opening. A cross brace 11, supported by the machine frame or legs, is provided with an aligned opening and supports a step form tubular housing 12. Housing 12 is formed with an outwardly extending lower flange, preferably provided with elongate slots 13, whereby the housing may be adjustably clamped to cross brace 11 by washers 14 and bolts 16.

The upper portion of housing 12 is provided with an inwardly projecting flange 17 forming a support for a rubber or the like disc 18 which is clamped between flange 17 and a collar 19, threadedly engaging the upper portion of the housing. A seal, generally indicated at 21, comprises a tubular metal shell clamped to and supported by disc 18. Packing material 22 is disposed in the upper portion of the shell and preferably comprises a hemp strand saturated with tallow or a similar lubricant. Pressure is continuously applied to the packing material 22 by a spring 23 to maintain the packing material in sealing engagement with a shaft 24. The seal described is well known, but if water is permitted to enter the seal along shaft 24, it causes rust particles which quickly destroy the sealing efficiency. Further, the water tends to wash away the lubricant causing failure of the seal in a relatively short time.

To prevent water contacting the seal, we provide a diving bell 26 of inverted cup form, and in the modification shown in Fig. 1, the diving bell is formed of rubber and has a thickened central flange 27 which sealingly grips shaft 24.

As the washing machine tub is filled with water, air will be trapped within the diving bell 26, since an air-tight connection is made between the diving bell and shaft 24 and also between seal 21 and the shaft. In a well known manner, the air pocket thus formed prevents the water level within the diving bell from reaching the top surface of collar 19 and resultantly prevents water from contacting the seal 21.

The housing 12 is sealingly clamped to tub base 10, preferably by a rubber washer 30, a lead washer 28, and a threaded collar 29.

Figure 2:
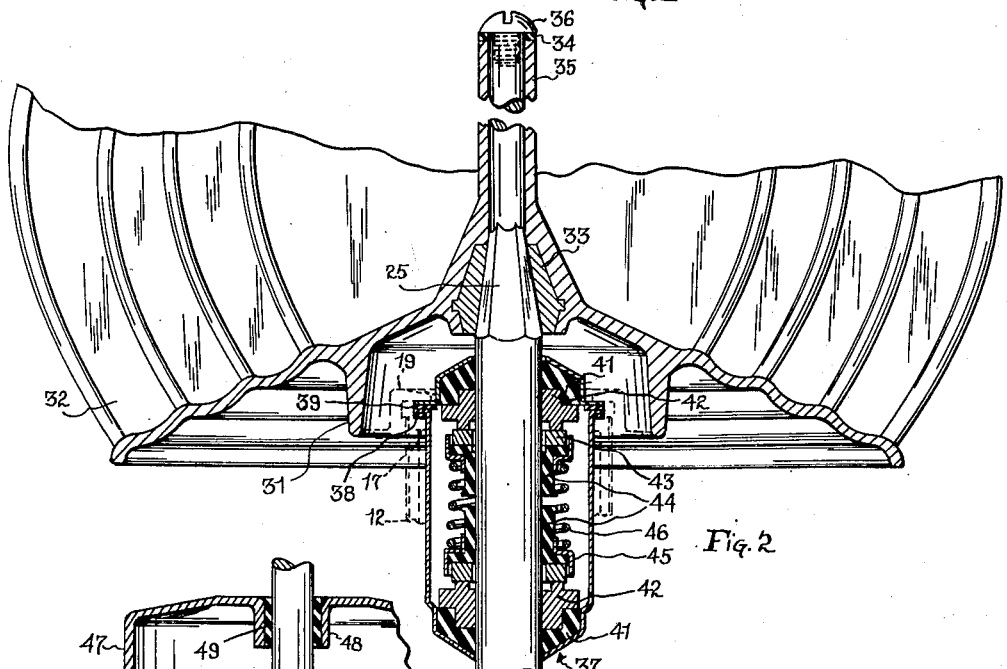
Figure 2 is a view similar to Fig. 1, showing a modification of the invention.

Referring now to Fig. 2, we have shown a modification of the invention wherein the diving bell, indicated at 31, is formed integral with an agitator or washing element 32. In both instances the shaft 24 is provided with flatted surfaces, as indicated at 26, which engage a bushing 33 formed integrally with the agitator to drivingly interconnect the agitator and shaft. In order to prevent any leakage of air upwardly along the shaft, we provide a sealing washing 34 between the tubular portion of the agitator which encircles the upper portion of shaft 24 and a screw 36 which detachably secures the agitator to the shaft.

In Fig. 1 we have shown a gland type seal wherein the packing material directly engages the shaft's surface, and as previously pointed out, the primary concern in preventing water from contacting a seal of this type is to prevent the formation of rust particles and avoid washing away of the lubricant.

In Fig. 2, we have shown a rotary type seal wherein the seal is effected along a plane at right angles to the shaft axis. The seal, generally indicated at 37, comprises a two-part metal shell formed to provide an outwardly extending flange 38, which is sealingly clamped between the flange 17 of housing 12 and collar 19. Sealing gaskets, as indicated at 39, are provided above and beneath flange 38. The upper portion of the shell has an inturned flange against which a gasket 41, preferably formed of synthetic rubber, abuts, and this gasket resiliently engages a shaft seal 42, preferably formed of carbon or other self-lubricating material. A similar gasket 41 and seal 42 is disposed at the lower or opposite end of the shell. Intermediate the seals 42 are rings 43, preferably formed of bronze, which engage friction rings 44 of L shaped cross section, and preferably formed of synthetic rubber. Metal rings 45 of Z shaped cross section exert pressure on ring 44 under the influence of a compression spring 46. In this type seal, it is important that water, particularly water containing detergents, be prevented from contacting the relatively movable sealing surfaces of the rings 43 which rotate with shaft 24 and the seals 42 which are held fixed, since otherwise, pitting of the sealing surfaces would occur.

Figure 3:
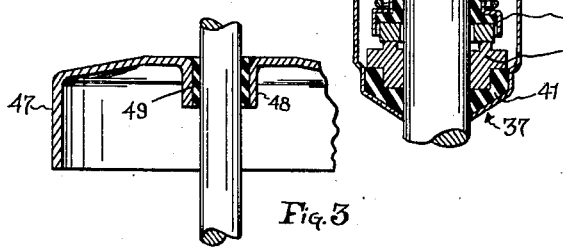
Figure 3 shows a modified type of diving bell which we may employ.

Referring now to Fig. 3, we have shown a further modification of the diving bell comprising a metal element 47, preferably aluminum, having a central tubular portion 48 within which is disposed a tube 49 formed of rubber or the like and which is adapted to sealingly grip shaft 24. Tube 49 is bonded to tubular portion 48 in a well known manner.

We wish it to be understood that we do not desire to be limited to the exact details of construction shown and described, for obvious modifications will occur to a person skilled in the art.

What is claimed is:

In a washing machine the combination with a tub having a perforated base, an oscillatable shaft projecting upwardly through the base perforation, a seal encircling the shaft and mounted in the base, and an agitator connected to the shaft above the seal, of means preventing liquid from contacting the seal, said means comprising a diving bell of inverted cup form having a generally circular flange and disposed between the base of the agitator and seal, the diving bell flange encircling the seal in spaced relation and extending a substantial distance below the seal top surface, the central portion of the bell being of resilient tubular form and gripping the shaft in air-tight relation, and the seal preventing the escape of air downwardly along the shaft whereby when the liquid level in the tub is above the diving bell an air pocket will be formed in the bell preventing liquid from contacting the seal.

RALPH E. KORTEPETER.
RALPH L. ARCHBOLD.

References Cited in the file of this patent

UNITED STATES PATENTS

| Number | Name | Date |
|---|---|---|
| 1,554,299 | Seibel | Sept. 22, 1925 |
| 1,741,317 | Kirby | Dec. 31, 1929 |
| 1,832,352 | Behan | Nov. 17, 1931 |
| 1,999,662 | Nell | Apr. 30, 1935 |
| 2,023,107 | Stoddard | Dec. 3, 1935 |
| 2,042,575 | Worth | June 2, 1936 |